US010589866B2

(12) United States Patent
Morishita et al.

(10) Patent No.: US 10,589,866 B2
(45) Date of Patent: Mar. 17, 2020

(54) ANTI-ICING SYSTEM AND AIRCRAFT

(71) Applicant: MITSUBISHI AIRCRAFT CORPORATION, Aichi (JP)

(72) Inventors: Masatoshi Morishita, Tokyo (JP); Masanori Tsujita, Tokyo (JP); Satoshi Watanabe, Tokyo (JP); Yoichi Uefuji, Tokyo (JP); Kazuhiro Kawai, Tokyo (JP); Toshiyuki Ishida, Tokyo (JP); Gento Ichikawa, Tokyo (JP); Go Fujita, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 299 days.

(21) Appl. No.: 15/390,799

(22) Filed: Dec. 27, 2016

(65) Prior Publication Data

US 2017/0210476 A1 Jul. 27, 2017

(30) Foreign Application Priority Data

Jan. 21, 2016 (JP) ................................. 2016-009788

(51) Int. Cl.
*B64D 15/04* (2006.01)
*B64C 3/00* (2006.01)
(52) U.S. Cl.
CPC ............... *B64D 15/04* (2013.01); *B64C 3/00* (2013.01)
(58) Field of Classification Search
CPC ................................ B64D 15/02; F02C 7/047
See application file for complete search history.

(56) References Cited

U.S. PATENT DOCUMENTS

| | | | | |
|---|---|---|---|---|
| 2,081,963 A | * | 6/1937 | Theodorsen | B64D 15/04 244/134 B |
| 2,097,926 A | * | 11/1937 | Kimball | B64D 15/16 106/13 |
| 2,187,506 A | * | 1/1940 | Daam | B64D 15/04 244/134 B |

(Continued)

FOREIGN PATENT DOCUMENTS

| | | |
|---|---|---|
| CN | 102756809 A | 10/2012 |
| DE | 102010051293 A1 | 5/2012 |

(Continued)

OTHER PUBLICATIONS

Extended European Search Report for EP16206234 dated Jun. 19, 2017.

(Continued)

*Primary Examiner* — Philip J Bonzell
(74) *Attorney, Agent, or Firm* — Pearne & Gordon LLP

(57) ABSTRACT

An anti-icing system according to the present invention includes: a piccolo tube that includes a flow path through which heated gas flows in the longitudinal direction from a rear end to a front end, and a plurality of ejection holes provided along the longitudinal direction to make the flow path communicate with an outside; and an engine serving as a supply source that supplies the heated gas toward the piccolo tube. The piccolo tube is decreased in an area of the flow path in a stepwise manner or in a continuous manner in the longitudinal direction, and has a continuous side surface provided with the ejection holes.

13 Claims, 6 Drawing Sheets

(56) References Cited

U.S. PATENT DOCUMENTS

| | | | | |
|---|---|---|---|---|
| 2,374,441 A * | 4/1945 | Loufek | B64D 15/02 237/12.3 A |
| 2,393,792 A * | 1/1946 | McCollum | B64D 15/02 126/110 R |
| 2,447,095 A * | 8/1948 | Schmidt | B64D 15/02 244/134 B |
| 2,514,105 A * | 7/1950 | Wilfred | B64D 15/02 165/134.1 |
| 2,556,736 A * | 6/1951 | Palmatier | B64D 15/02 239/76 |
| 3,917,193 A * | 11/1975 | Runnels, Jr. | B64C 9/24 244/134 B |
| 4,485,619 A * | 12/1984 | Moore | F02C 7/047 415/175 |
| 4,741,499 A * | 5/1988 | Rudolph | B64D 15/04 244/134 B |
| 4,752,049 A | 6/1988 | Cole | |
| 4,976,397 A * | 12/1990 | Rudolph | B64D 15/04 244/134 B |
| 5,011,098 A * | 4/1991 | McLaren | B64D 15/04 244/134 B |
| 5,807,454 A * | 9/1998 | Kawabe | B29C 70/443 156/214 |
| 5,865,400 A * | 2/1999 | Pike | B64D 15/04 239/587.1 |
| 5,873,544 A * | 2/1999 | Pike | B64D 15/04 174/51 |
| 6,003,814 A * | 12/1999 | Pike | B64D 15/04 239/587.1 |
| 6,119,978 A * | 9/2000 | Kobayashi | B21D 26/055 244/134 R |
| 6,279,228 B1 * | 8/2001 | Kobayashi | B21D 26/055 228/190 |
| 6,467,730 B2 * | 10/2002 | Laugt | B64D 15/04 244/123.14 |
| 8,100,364 B2 * | 1/2012 | Nieman | B64D 15/04 244/134 B |
| 8,579,236 B2 * | 11/2013 | Wollaston | B64D 15/04 244/134 B |
| 9,815,558 B2 * | 11/2017 | Saeed | B64D 15/04 |
| 2001/0023909 A1 | 9/2001 | Laugt | |
| 2010/0176243 A1 * | 7/2010 | Nieman | B64D 15/04 244/134 B |
| 2012/0187254 A1 * | 7/2012 | Wollaston | B64C 9/22 244/214 |
| 2017/0166313 A1 * | 6/2017 | Saeed | B64D 15/04 |

FOREIGN PATENT DOCUMENTS

| | | |
|---|---|---|
| EP | 0230684 A1 | 8/1987 |
| GB | 486549 A | 6/1938 |
| JP | 61-160395 A | 7/1986 |
| JP | 62-157898 A | 7/1987 |
| JP | 11-034993 A | 2/1999 |
| WO | 2014202164 A1 | 12/2014 |

OTHER PUBLICATIONS

Office Action dated Oct. 23, 2019 for JP Application No. 2019-009788 and English translation thereof.

Sreedharan, C. et al. "Effect of Hot Air Jets from a Piccolo Tube in Aircraft Wing Anti-Icing Unit", IN: MSRUAS-SASTech Journal, Nov. 9, 2015, vol. 13, No. 2, pp. 1-5.

* cited by examiner

ANTI-ICING SYSTEM AND AIRCRAFT

BACKGROUND OF THE INVENTION

Field of the Invention

The present invention relates to an anti-icing system that prevents icing on a leading edge of an aircraft, and to an aircraft including the anti-icing system.

Description of the Related Art

During flight of an aircraft, icing occurs on an outer surface of a leading edge in a traveling direction of the aircraft, such as a main wing, a tail wing, and an air intake, due to collision of supercooled droplets in the air. The icing phenomenon variously influences flight of the aircraft. Therefore, anti-icing systems that prevent icing by various heating means are provided at positions that may be particularly affected by the icing phenomenon.

In an aircraft including a turbine engine, as one of the anti-icing systems, bleed air that is high-temperature high-pressure air extracted from an engine compressor has been widely used as a heating source. In such an anti-icing system, the bleed air is guided through a pipe and is blown to the inner surface of the leading edge, thereby performing heating. A member called a piccolo tube that has a plurality of ejection holes through which the bleed air is ejected in the longitudinal direction is used as the pipe. For example, when being provided in the main wing, the piccolo tube is disposed near the leading edge along a wing length direction from an end connected to a fuselage toward a front end.

Equalizing, in the longitudinal direction, a flow rate of the bleed air that is blown from the ejection holes of the piccolo tube to the inner surface of the leading edge makes it possible to maintain desired anti-icing capability in the wing length direction. To equalize, in the longitudinal direction, the flow rate of the bleed air blown to the inner surface of the leading edge, a pressure of the bleed air in the flow path of the piccolo tube through which the bleed air flows, that is, a total pressure may be desirably maintained constant in the longitudinal direction.

Therefore, for example, as described in Japanese Patent Laid-Open No. 11-34993 (FIG. 10), the inner diameter of the piccolo tube, the diameter of the flow path through which the bleed air flows, i.e., the area of the flow path, is reduced in a stepwise manner from the end of the main wing connected to the fuselage toward the front end thereof in, for example, three steps to form a tapered shape. This increases the flow rate as the bleed air flows through the flow path toward the front end, and maintains the constant total pressure.

As illustrated in FIGS. 6A to 6D, an existing tapered piccolo tube 101 is configured of, for example, three pipes 102, 103, and 104 that are connected with one another such that central axes C102, C103, and C104 of the respective pipes 102, 103, and 104 are coaxial with one another. The three pipes 102, 103, and 104 are prepared to respectively have different diameters d102, d103, and d104 of a flow path 105. Accordingly, a distance from the piccolo tube 101 to an inner surface 6 of a leading edge 5 of a main wing 3 that is a surface subjected to ejection of the bleed air varies in a stepwise manner and is not fixed along a longitudinal direction. More specifically, a distance from an ejection hole to the inner surface of the leading edge is longer at a front end of the piccolo tube than at a connection end thereof.

Note that reference numerals D102, D103, and D104 respectively represent outer diameters of the pipes 102, 103, and 104.

In this case, the distances from the respective ejection holes of the piccolo tube to the surface subjected to ejection may be desirably equal to one another over the connection end to the front end because the distance influences heat transfer coefficient.

In the existing stepwise tapered piccolo tube, however, the distances from the respective ejection holes to the surface subjected to ejection are not equal to one another. This makes it difficult to obtain an ideal heat transfer coefficient from the connection end to the front end, which may cause unevenness of anti-icing performance.

Accordingly, an object of the present invention is to provide an anti-icing system that makes it possible to maintain constant pressure of the bleed air in the flow path of the piccolo tube in the longitudinal direction, and to make the distances from the respective ejection holes of the bleed air of the piccolo tube to the surface subjected to ejection equal to one another in the longitudinal direction.

SUMMARY OF THE INVENTION

An anti-icing system according to the present invention includes: a piccolo tube that includes a flow path through which heated gas flows in a longitudinal direction from a rear end to a front end, and a plurality of ejection holes provided along the longitudinal direction to make the flow path communicate with an outside; and a supply source that supplies the heated gas toward the piccolo tube.

The piccolo tube according to the present invention is decreased in an opening area of the flow path in a stepwise manner or in a continuous manner in the longitudinal direction, and has a continuous side surface provided with the ejection holes.

In the anti-icing system according to the present invention, $H/d_0$ may be preferably within a range of 7 to 12, where $d_0$ is the diameter of each of the ejection holes, and H is the distance from each of the ejection holes to the surface subjected to ejection of the heated gas.

The anti-icing system according to the present invention is usable in an aircraft, and may be preferably applied particularly to a main wing of the aircraft.

In the anti-icing system according to the present invention, the piccolo tube may be configured of a plurality of pipes that are connected with one another in the longitudinal direction while central axes of the respective pipes are eccentric to one another. The pipes have different inner diameters and different outer diameters from one another.

Although the piccolo tube having the configuration is fabricated by connecting the plurality of pipes, it is sufficient to linearly align side surfaces provided with the ejection holes of the respective pipes in connection, which facilitates positioning. Further, it is sufficient to use pipes having thicknesses corresponding to respective outer diameters, which does not increase its weight.

In the anti-icing system according to the present invention, the piccolo tube may be configured of a plurality of pipes that are connected with one another in the longitudinal direction while central axes of the respective pipes are aligned. The pipes have different inner diameters from one another and the same outer diameter.

Since the piccolo tube having the configuration is configured using the pipes that have the same outer diameter, mutual positioning of the pipes is extremely easy. Therefore, the piccolo tube is excellent in manufacturability.

In the anti-icing system according to the present invention, the piccolo tube may have an inner diameter and an outer diameter that decrease in a continuous manner from a rear end to a front end.

Since the heat transfer coefficient depending on the distance with the anti-icing object is obtainable, the piccolo tube having the configuration is excellent in anti-icing performance.

In the anti-icing system according to the present invention, although the piccolo tube has a fixed inner diameter and a fixed outer diameter from the rear end to the front end, a spacer may be inserted into the flow path to cause the diameter of the flow path to taper off. The tapered form in the configuration may include both a tapered form in a stepwise manner and a tapered form in a continuous manner.

Since the heat transfer coefficient depending on the distance with the anti-icing object is obtainable, the piccolo tube having the configuration is also excellent in anti-icing performance.

In the anti-icing system according to the present invention, the ejection holes may be arranged in one or a plurality of lines along the longitudinal direction.

In the case where the ejection holes are provided in the plurality of lines, the ejection holes may be arranged in a staggered arrangement.

The anti-icing system according to the present invention makes it possible to maintain the constant pressure of the bleed air in the flow path of the piccolo tube in the longitudinal direction, and to make the distances from the respective ejection holes of the bleed air of the piccolo tube to the surface subjected to ejection equal to one another in the longitudinal direction.

BRIEF DESCRIPTION OF THE DRAWINGS

FIG. 1A is a plan view of the anti-icing system including a main wing of an aircraft, and FIG. 1B is a cross-sectional diagram of the main wing;

FIG. 2A is a plan view, FIG. 2B is a cross-sectional diagram as viewed from an arrow IIb-IIb of FIG. 2A, FIG. 2C is a cross-sectional diagram as viewed from an arrow IIc-IIc of FIG. 2A, FIG. 2D is a cross-sectional diagram as viewed from an arrow IId-IId of FIG. 2A, and FIG. 2E is a cross-sectional diagram as viewed from an arrow IIe-IIe of FIG. 2A;

FIG. 3A is a plan view, FIG. 3B is a cross-sectional diagram as viewed from an arrow IIIb-IIIb of FIG. 3A, FIG. 3C is a cross-sectional diagram as viewed from an arrow IIIc-IIIc of FIG. 3A, and FIG. 3D is a cross-sectional diagram as viewed from an arrow IIId-IIId of FIG. 3A;

FIG. 4A is a plan view, FIG. 4B is a cross-sectional diagram as viewed from an arrow IVb-IVb of FIG. 4A, FIG. 4C is a cross-sectional diagram as viewed from an arrow IVc-IVc of FIG. 4A, and FIG. 4D is a cross-sectional diagram as viewed from an arrow IVd-IVd of FIG. 4A;

FIG. 5A is a plan view, FIG. 5B is a cross-sectional diagram as viewed from an arrow Vb-Vb of FIG. 5A, FIG. 5C is a cross-sectional diagram as viewed from an arrow Vc-Vc of FIG. 5A, FIG. 5D is a cross-sectional diagram as viewed from an arrow Vd-Vd of FIG. 5A, FIG. 6A is a plan view, FIG. 6B is a cross-sectional diagram as viewed from an arrow VIb-VIb of FIG. 6A, FIG. 6C is a cross-sectional diagram as viewed from an arrow VIc-VIc of FIG. 6A, and FIG. 6D is a cross-sectional diagram as viewed from an arrow VId-VId of FIG. 6A.

DETAILED DESCRIPTION OF THE PREFERRED EMBODIMENT

An embodiment of an anti-icing system according to the present invention is described below with reference to accompanying drawings.

Figure 1A:
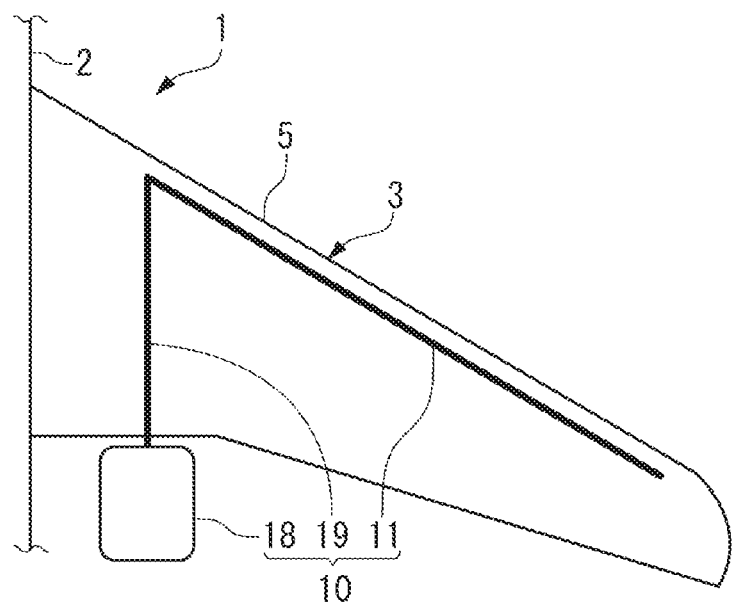
FIGS. 1A and 1B are diagrams each illustrating a schematic configuration of an anti-icing system according to an embodiment of the present invention, where

As illustrated in FIG. 1A, an anti-icing system 10 according to the present embodiment is provided inside a main wing 3 of an aircraft 1, thereby preventing icing on an outer surface 7 of a leading edge 5 of the main wing 3.

Figure 1B:
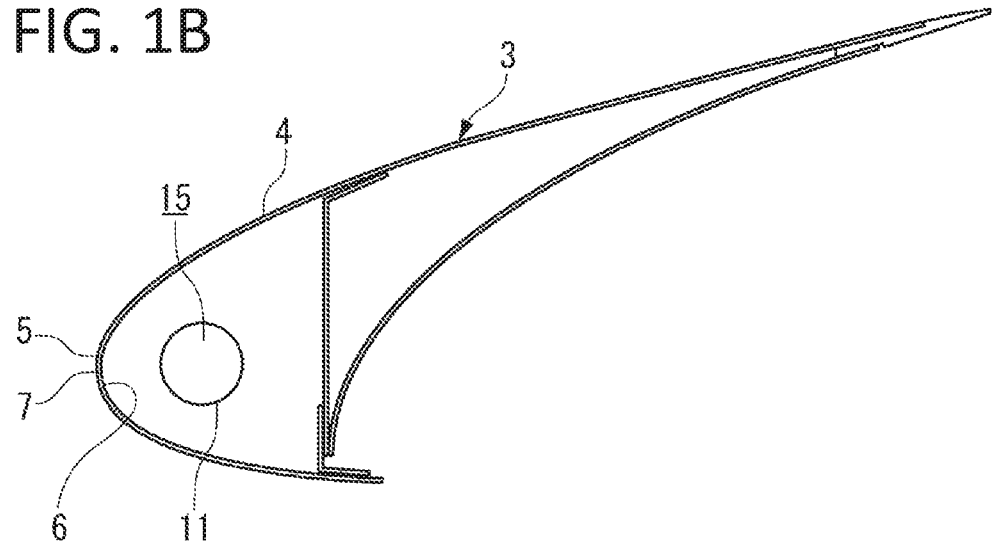

The main wing 3 has an outer hull configured of a wing panel 4. The wing panel 4 is made of, for example, an aluminum alloy, or a fiber reinforced resin such as carbon fiber reinforced plastics (CFRP) and glass fiver reinforced plastics (GFRP). As illustrated in FIG. 1B, a cross-sectional surface of the leading edge 5 along a wing length direction of the wing panel 4 has a curved shape through bending process. The anti-icing system 10 ejects bleed air that is heated air, toward an inner surface 6 of the leading edge 5, thereby preventing icing on the outer surface 7.

As illustrated in FIG. 1A, the anti-icing system 10 includes: a piccolo tube 11 that ejects the bleed air to the leading edge 5; an engine 18 that is a supply source of the bleed air; and an air supply tube 19 that connects the piccolo tube 11 with the engine 18, and guides the bleed air to the piccolo tube 11. The engine 18 is to obtain thrust force of the aircraft 1, and may be, for example, a jet engine mounted to a bottom surface of the main wing 3. The bleed air handled in this system is obtained by performing pre-cooling of the air extracted from a compressor of the jet engine, and has appropriate temperature.

As illustrated in FIGS. 1A and 1B, the piccolo tube 11 is disposed along the wing length direction of the main wing 3 at a position separated from the inner surface 6 of the leading edge 5 by a predetermined distance. In the piccolo tube 11 according to the present embodiment, a flow path 15 through which the bleed air flows narrows in a stepwise manner along a flowing direction of the bleed air. In addition, a side surface of the piccolo tube 11 that faces the inner surface 6 and is provided with ejection holes 16 from which the bleed air is ejected is a continuous surface. The ejection holes 16 make the flow path 15 communicate with an outside of the piccolo tube 11.

Figure 2A:
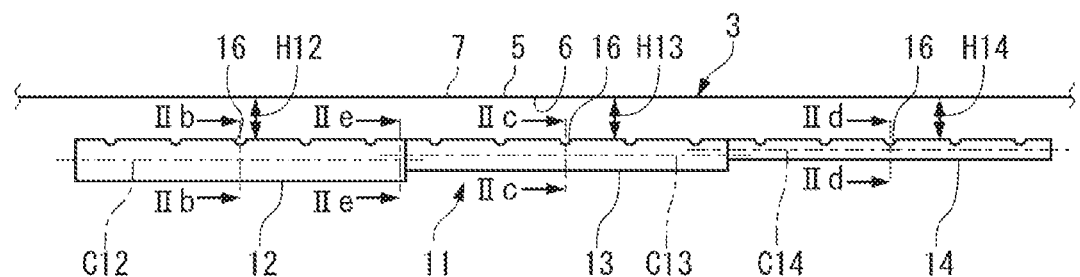
FIGS. 2A to 2E are diagrams each illustrating a piccolo tube of FIGS. 1A and 1B, where

As illustrated in FIG. 2A, the piccolo tube 11 includes three parts, namely, an upstream tube 12, a middle-stream tube 13, and a downstream tube 14 that are disposed in order from upstream side continuous with the air supply tube 19. Note that the upstream, the middle-stream, and the downstream are expression used for discriminating the three parts from one another, and merely express relative relation of the three parts.

Figure 2B:
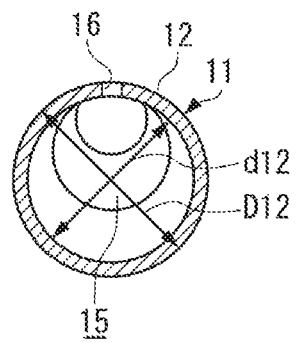
Figure 2C:
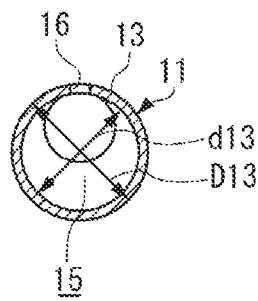
Figure 2D:
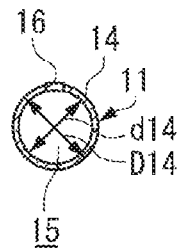
Figure 2E:
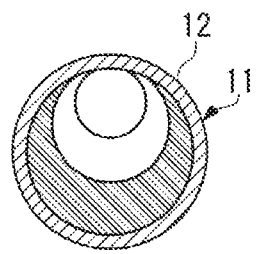
Figure 3A:
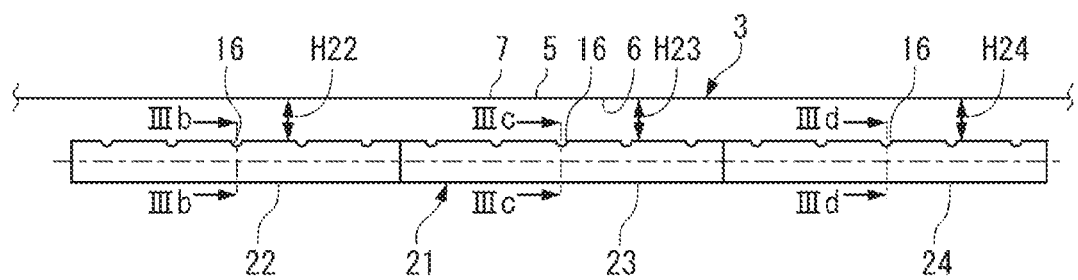
FIGS. 3A to 3D are diagrams each illustrating a modification of the piccolo tube of FIGS. 1A and 1B, where
Figure 3B:
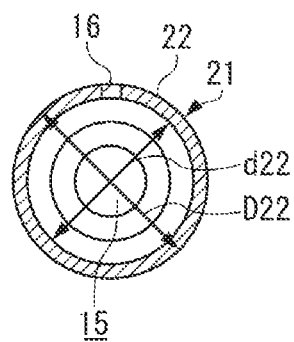
Figure 3C:
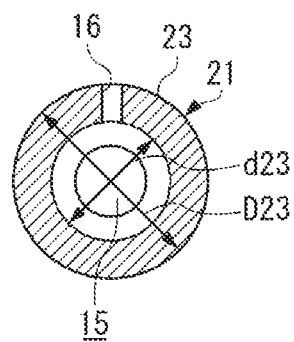
Figure 3D:
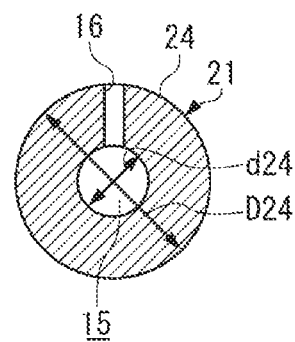
Figure 4A:
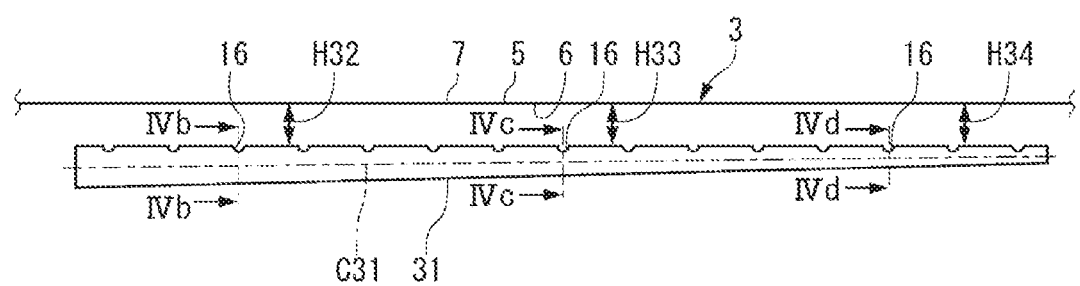
FIGS. 4A to 4D are diagrams each illustrating another modification of the piccolo tube of FIGS. 1A and 1B, where
Figure 4B:
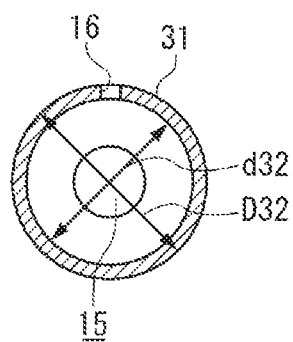
Figure 4C:
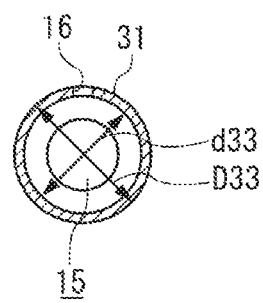
Figure 4D:
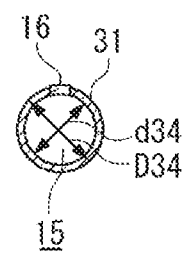
Figure 5A:
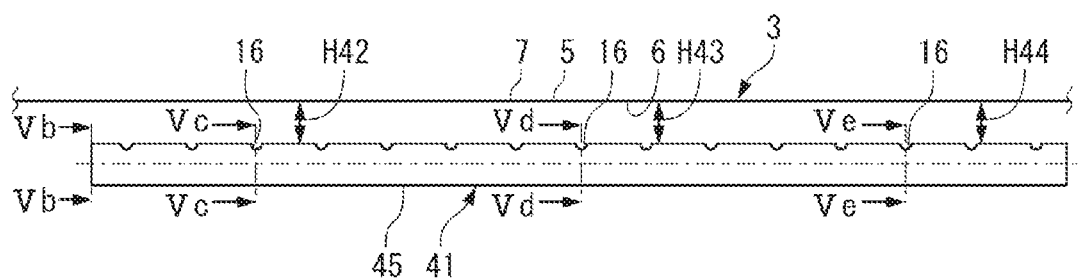
FIGS. 5A to 5D are diagrams each illustrating still another modification of the piccolo tube of FIGS. 1A and 1B, where
Figure 5B:
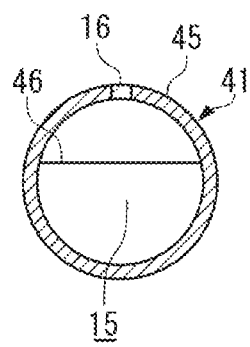
Figure 5C:
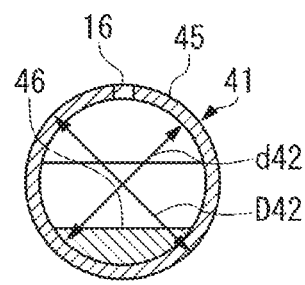
Figure 5D:
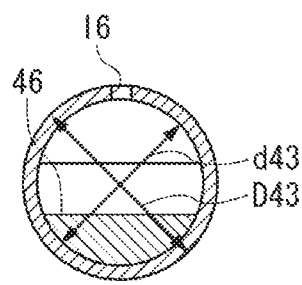
Figure 5E:
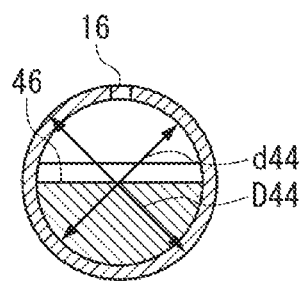
FIG. 5E is a cross-sectional diagram as viewed from an arrow Ve-Ve of FIG. 5A.
Figure 6A:
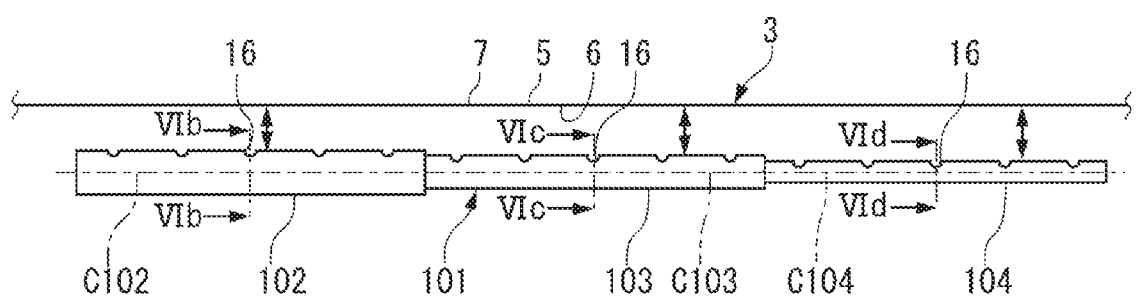
FIGS. 6A to 6D are diagrams each illustrating an existing piccolo tube, where
Figure 6B:
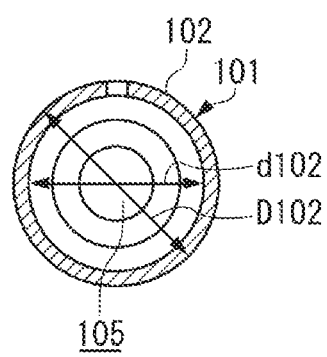
Figure 6C:
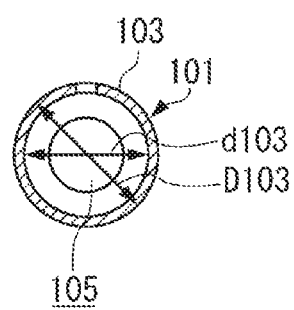
Figure 6D:
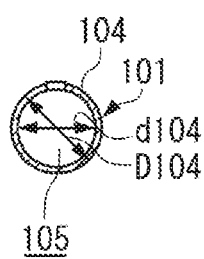

As illustrated in FIGS. 2B to 2D, each of the upstream tube 12, the middle-stream tube 13, and the downstream tube 14 is configured of a hollow cylindrical member, and a hollow part of the member configure the flow path 15 through which the bleed air flows.

As illustrated in FIGS. 2A, 2B, and 2C, when inner diameters of the upstream tube 12, the middle-stream tube 13, and the downstream tube 14 are respectively denoted by d12, d13, and d14, and outer diameters thereof are respectively denoted by D12, D13, and D14, the upstream tube 12, the middle-stream tube 13, and the downstream tube 14 are so formed as to establish the following expressions. In other words, in the piccolo tube 11, respective opening areas A12, A13, and A14 of the flow path 15 in the upstream tube 12, the middle-stream tube 13, and the downstream tube 14 are decreased in a stepwise manner along the flowing direction of the bleed air.

d12>d13>d14

D12>D13>D14

A12>A13>A14

As illustrated in FIG. 2A, in the piccolo tube 11, respective center axes C12, C13, and C14 of the upstream tube 12, the middle-stream tube 13, and the downstream tube 14 are made eccentric from one another. The piccolo tube 11 is configured by connecting, through welding or other process, the upstream tube 12, the middle-stream tube 13, and the downstream tube 14 that are prepared as separate tubes.

The piccolo tube 11 has the plurality of ejection holes 16 that open to face the inner surface 6 of the leading edge 5. As illustrated in FIG. 2A, the ejection holes 16 are arranged in a straight line with predetermined intervals in a longitudinal direction of the piccolo tube 11. The bleed air that has flowed from the air supply tube 19 into the piccolo tube 11 is ejected as high-temperature high-speed jet flow from the ejection holes 16 toward the inner surface 6 of the leading edge 5.

Making the center axes C12, C13, and C14 eccentric forms a continuous flat outer surface of the piccolo tube 11 provided with the ejection holes 16. This allows the anti-icing system 10 to make distances H12, H13, and H14 from the inner surface 6 of the wing panel 4 respectively to the upstream tube 12, the middle-stream tube 13, and the downstream tube 14 that configure the piccolo tube 11, equal to one another. In other words, the anti-icing system 10 makes the distance from the piccolo tube 11 to the inner surface 6 constant along the longitudinal direction of the piccolo tube 11.

Further, in the piccolo tube 11, the upstream tube 12 has the largest opening diameter of the flow path 15, that is, the largest opening area of the flow path 15, followed by the middle-stream tube 13 and the downstream tube 14. This makes it possible to make the pressure of the bleed air of the flow path 15 in each of the upstream tube 12, the middle-stream tube 13, and the downstream tube 14 substantially constant.

As mentioned above, the anti-icing system 10 makes it possible to maintain the constant pressure of the bleed air of the flow path 15 of the piccolo tube 11 over the main wing 3 in the longitudinal direction, and to accordingly maintain the constant flow rate of the bleed air ejected from the plurality of ejection holes 16. Consequently, it is possible to retain desired anti-icing capability over the main wing 3 in the wing length direction.

Furthermore, according to the anti-icing system 10, the side surface provided with the plurality of ejection holes 16 is a continuous surface, which makes it possible to make the distances from the respective ejection holes 16 of the piccolo tube 11 to the inner surface 6 of the leading edge 5 equal to one another over the main wing 3 in the wing length direction. This results in the maximum heat transfer coefficient of collision jet flow in any position in the wing length direction. Accordingly, the anti-icing performance is improved over the main wing 3 in the wing length direction, which contributes to stable flight of the aircraft 1. Furthermore, it is possible to obtain the maximum heat transfer coefficient of the collision jet flow, and to accordingly reduce the amount of the bleed air extracted from the engine 18. This contributes to improvement of the fuel consumption of the aircraft 1.

Moreover, it is well-known that the heat transfer coefficient of a collision flat plate of the collision jet flow typically depends on a collision speed, a variable speed caused by a large-scale vortex, a variable period, turbulence intensity, etc. In this case, the maximum heat transfer coefficient $\alpha$max in the two-dimensional collision jet flow is obtainable when $H/d_0$ is about 9. This is because the collision speed (the maximum flow rate) of the jet flow is not largely attenuated, and the turbulence intensity increases as well. Note that $d_0$ is the diameter of each of the ejection holes 16, and H is the distance from each of the ejection holes 16 to the inner surface 6 of the leading edge 5, that is, to the surface subjected to ejection of the heated gas. Accordingly, the piccolo tube 11 may desirably adopt the shape that allows $H/d_0$ to be within a range of 7 to 12 and be arranged with respect to the leading edge 5 so that the ejected bleed air obtains high heat transfer coefficient, and $H/d_0$ may be more preferably within a range of 8 to 11.

The piccolo tube 11 as mentioned above is configured by connecting the upstream tube 12, the middle-stream tube 13, and the downstream tube 14 that have different inner diameters and outer diameters from one another. The piccolo tube according to the present invention, however, is not limited thereto, and may adopt any other configuration. Some examples of the configuration are described with reference to FIG. 3A to FIG. 5E. As illustrated in FIG. 3A to FIG. 5E, any piccolo tube has a continuous side surface provided with the plurality of ejection holes 16.

A piccolo tube 21 illustrated in FIGS. 3A to 3D is configured by connecting an upstream tube 22, a middle-stream tube 23, and a downstream tube 24 that have the same outer diameter but have different inner diameters from one another. In other words, as illustrated in FIGS. 3A, 3B, 3C, and 3D, when the inner diameters of the upstream tube 22, the middle-stream tube 23, and the downstream tube 24 of the piccolo tube 21 are respectively denoted by d22, d23, and d24, the outer diameters thereof are respectively denoted by D22, D23, and D24, and flow path areas thereof are respectively denoted by A22, A23, and A24, the following expressions are established. In other words, the opening area of the flow path 15 of the piccolo tube 21 also decreases in a stepwise manner along the flowing direction of the bleed air.

d22>d23>d24

D22=D23=D24

A22>A23>A24

Since the piccolo tube 21 has the above-described configuration, the piccolo tube 21 exerts action and effects similar to those of the above-described piccolo tube 11.

In addition, since the upstream tube 22, the middle-stream tube 23, and the downstream tube 24 of the piccolo tube 21 have the same outer diameters, alignment in the radial direction in connection is easy. The piccolo tube 21, however, is larger in thickness of the middle-stream tube 23 and the downstream tube 24 than the piccolo tube 11. Therefore, the piccolo tube 11 is advantageous in terms of weight reduction.

Next, in a piccolo tube 31 illustrated in FIGS. 4A to 4D, both the inner diameter and the outer diameter continuously decreases from the rear end to the front end of the piccolo tube 31. In other words, as illustrated in FIGS. 4A, 4B, 4C, and 4D, when inner diameters at an upstream position, a middle-stream position, and a downstream position of the piccolo tube 31 are respectively denoted by d32, d33, and d34, outer diameters at the positions are respectively denoted by D32, D33, and D34, and flow path areas at the positions are respectively denoted by A32, A33, and A34, the following expressions are established. In other words, the opening area of the flow path 15 of the piccolo tube 31 continuously decreases along the flowing direction of the bleed air.

d32>d33>d34

D32>D33>D34

A32>A33>A34

Since the piccolo tube 31 illustrated in FIGS. 4A to 4D has the above-described configuration, the piccolo tube 31 exerts action and effects similar to those of the above-described piccolo tube 11.

In addition, the inner diameter of the piccolo tube 31 continuously decreases. In other words, the opening area of the flow path 15 continuously decreases, which brings the pressure of the bleed air in the flow path 15 closer to constant.

Note that, although the outer diameter of the piccolo tube 31 continuously decreases, the outer diameter may be fixed in the longitudinal direction.

Although a piccolo tube 41 illustrated in FIGS. 5A to 5E uses a pipe 45 that has a fixed inner diameter and a fixed outer diameter, a spacer 46 is inserted into and embedded inside the pipe 45, which continuously reduces the opening area of the flow path 15 along the flowing direction of the bleed air, that is, the opening area of the flow path 15 tapers off. In other words, as illustrated in FIGS. 5A, 5B, 5C, 5D, and 5E, when inner diameters at an upstream position, a middle-stream position, and a downstream position of the piccolo tube 41 are respectively denoted by d42, d43, and d44, outer diameters at the positions are respectively denoted by D42, D43, and D44, and flow path area at the positions are respectively denoted by A42, A43, and A44, the following expressions are established.

d42=d43=d44

D42=D43=D44

A42>A43>A44

Other than the above, the configurations described in the above-described embodiment may be selected or the configuration may be appropriately modified without departing from the scope of the present invention.

In the piccolo tube 11 and the like as mentioned above, the example in which the plurality of ejection holes 16 are arranged in one line has been described; however, the present invention is not limited to the example, and the plurality of ejection holes 16 may be arranged in a plurality of lines, for example, in two lines. Also in the case where the ejection holes 16 are arranged in two lines, for example, using the piccolo tube 21 illustrated in FIGS. 3A to 3D or the piccolo tube 31 illustrated in FIGS. 4A to 4D makes it possible to make the distances H from the respective ejection holes 16 included in both of the two lines to the inner surface 6 equal to one another.

Further, the above-described piccolo tube 11 and the like are used for the main wing 3 of the aircraft 1; however, the intended purpose of the piccolo tube of the present invention is not limited to the main wing 3, and the piccolo tube of the present invention is applicable to a leading edge or a front edge in the traveling direction of the aircraft, such as a front edge of a tail wing or an air intake of the aircraft.

What is claimed is:

1. An anti-icing system, comprising:
a piccolo tube that includes a flow path through which heated gas flows in a longitudinal direction from a rear end to a front end, and a plurality of ejection holes provided along the longitudinal direction to make the flow path communicate with an outside; and
a supply source that supplies the heated gas toward the piccolo tube, wherein
the piccolo tube is decreased in an area of the flow path in a stepwise manner or in a continuous manner in the longitudinal direction, and has a continuous side surface provided with the ejection holes being spaced apart along the continuous side surface from one another and from a surface subjected to ejection of the heated gas, and
the piccolo tube is disposed such that a distance from each of the ejection holes to the surface subjected to ejection of the heated gas is constant along the longitudinal direction of the piccolo tube,
wherein the piccolo tube is configured of a plurality of pipes that are connected with one another in the longitudinal direction while central axes of the respective pipes are eccentric to one another, the pipes having different inner diameters and different outer diameters from one another.

2. The anti-icing system according to claim 1, wherein the piccolo tube is configured of a plurality of pipes that are connected with one another in the longitudinal direction while central axes of the respective pipes are aligned, the pipes having different inner diameters from one another and a same outer diameter.

3. The anti-icing system according to claim 1, wherein the piccolo tube has an inner diameter and an outer diameter that decrease in a continuous manner from the rear end to the front end.

4. The anti-icing system according to claim 1, wherein the piccolo tube has a fixed inner diameter and a fixed outer diameter from the rear end to the front end, and a spacer is inserted into the flow path to cause the diameter of the flow path to taper off.

5. The anti-icing system according to claim 1, wherein $H/d_0$ is within a range of 7 to 12, where $d_0$ is a diameter of each of the ejection holes, and H is a distance from each of the ejection holes to a surface subjected to ejection of the heated gas.

6. The anti-icing system according to claim 1, wherein $H/d_0$ is within a range of 8 to 11, where $d_0$ is a diameter of each of the ejection holes, and H is a distance from each of the ejection holes to a surface subjected to ejection of the heated gas.

7. The anti-icing system according to claim 1, wherein the plurality of ejection holes are arranged in a plurality of lines.

8. The anti-icing system according to claim 1, wherein the piccolo tube is disposed along a wing length direction of a main wing of an aircraft at a position separated from an inner surface of a leading edge of the main wing by a predetermined distance, wherein the surface subjected to ejection of the heated gas is located on the inner surface.

9. The anti-icing system according to claim 1, wherein the system is configured to allow, at respective distances from the continuous side surface being constant along the longitudinal direction of the piccolo tube, flow of the gases radially outwardly along the continuous side surface beyond the circumferences of the respective ejection holes upon exiting through the ejection holes.

10. The anti-icing system according to claim 1, wherein the continuous side surface fully circumferentially encloses the flow path of the gases along extents of the piccolo tube having the continuous side surface, the extents being disposed longitudinally between adjacent ejection holes along the longitudinal direction of the piccolo tube.

11. An aircraft comprising the anti-icing system according to claim 1.

12. The aircraft according to claim 11, wherein the anti-icing system is provided in a main wing.

13. An anti-icing system, comprising:
  a piccolo tube that includes a flow path through which heated gas flows in a longitudinal direction from a rear end to a front end, and a plurality of ejection holes provided along the longitudinal direction to make the flow path communicate with an outside; and
  a supply source that supplies the heated gas toward the piccolo tube, wherein
  the piccolo tube is decreased in an area of the flow path in a stepwise manner or in a continuous manner in the longitudinal direction, and has a continuous side surface provided with the ejection holes being spaced apart along the continuous side surface from one another and from a surface subjected to ejection of the heated gas, and
  the piccolo tube is disposed such that a distance from each of the ejection holes to the surface subjected to ejection of the heated gas is constant along the longitudinal direction of the piccolo tube,
  wherein the piccolo tube is configured of a plurality of pipes that are connected with one another in the longitudinal direction while central axes of the respective pipes are aligned, the pipes having different inner diameters from one another and a same outer diameter.

* * * * *